United States Patent

Siegel et al.

[11] 3,997,522
[45] Dec. 14, 1976

[54] DISAZO DYESTUFFS

[75] Inventors: Edgar Siegel; Horst Nickel, both of Leverkusen, Germany

[73] Assignee: Bayer Aktiengesellschaft, Leverkusen, Germany

[22] Filed: Jan. 31, 1973

[21] Appl. No.: 328,436

Related U.S. Application Data

[63] Continuation of Ser. No. 39,913, May 22, 1970, abandoned.

[30] Foreign Application Priority Data

May 31, 1969 Germany ............... 1927918

[52] U.S. Cl. ............... 260/186; 260/174; 260/178; 260/184; 260/206
[51] Int. Cl.² ............... C09B 31/06; D06P 3/24
[58] Field of Search ......... 260/174, 177, 184, 185, 260/186, 191, 178

[56] References Cited

UNITED STATES PATENTS

| | | | |
|---|---|---|---|
| 2,134,521 | 10/1938 | Knight | 260/186 |
| 2,497,246 | 2/1950 | Von Glahn | 260/186 |
| 2,782,185 | 2/1957 | Merian | 260/186 |
| 3,100,769 | 8/1963 | Gaetani | 260/186 |
| 3,186,787 | 6/1965 | Gies et al. | 260/186 X |
| 3,274,172 | 9/1966 | Koike et al. | 260/187 |
| 3,485,814 | 12/1969 | Speck | 260/186 |
| 3,523,935 | 8/1970 | Armento et al. | 260/186 |
| 3,594,363 | 7/1971 | Stingl | 260/186 |
| 3,676,050 | 7/1972 | James | 260/191 X |
| 3,725,384 | 4/1973 | Zickendraht et al. | 260/186 |

*Primary Examiner*—Floyd D. Higel
*Attorney, Agent, or Firm*—Plumley and Tyner

[57] ABSTRACT

Disazo dyestuffs which in the form of the free acid correspond to the general formula

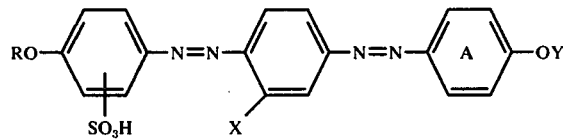

wherein R denotes an alkyl radical with 1–4 carbon atoms, X represents hydrogen or a methyl group and Y represents hydrogen or an alkyl radical with 1–4 carbon atoms, and the ring A can be substituted by chlorine or alkyl groups with 1–4 C atoms.

The dyestuffs are especially suitable for dyeing polyamide fibers from neutral to weakly acid dyebaths. The dyeings are of good light fastness.

5 Claims, No Drawings

DISAZO DYESTUFFS

This is a continuation of application Ser. No. 39,913 filed May 22, 1970 now abandoned.

The subject of the present invention are new, valuable disazo dyestuffs, which in the form of the free acids correspond to the general formula

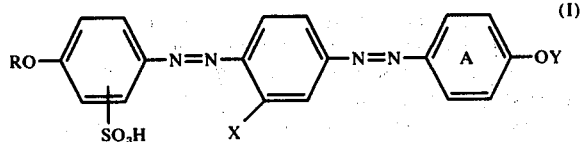
(I)

wherein
R denotes an alkyl radical with 1–4 carbon atoms,
X represents hydrogen or a methyl group, and
Y represents hydrogen or an alkyl radical with 1–4 carbon atoms, and
the ring A can be substituted by chlorine or alkyl groups with 1–4 C atoms, as well as their manufacture and use for dyeing synthetic fibre materials, especially those of polyamides.

The new dyestuffs are obtained if 4-alkoxyanilinesulphonic acids of general formula

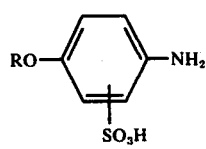
(II)

wherein
R has the indicated significance,
are diazotised and combined with coupling components of general formula

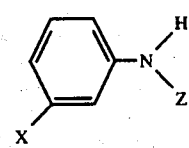
(III)

wherein
Z represents H or the radical of a group which can be split off and which facilitates the coupling, for example a sulphoalkylene group or a sulphonic acid group, the monoazo dyestuffs thus obtained, of formula

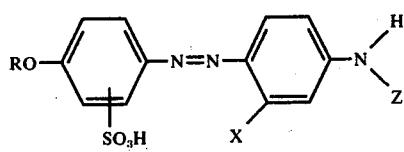
(IV)

are further diazotised, where appropriate after liberating the amino group protected by the radical Z, and coupled, in an alkaline medium, to phenols of formula

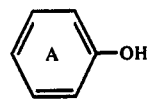
(V)

wherein
the ring A can be substituted by chlorine or alkyl groups with 1–4 carbon atoms,
and the hydroxyl group, where appropriate, is subsequently alkylated with alkylating agents which introduce 1–4 carbon atoms.

Suitable 4-alkoxy-anilinesulphonic acids are for example: 4-methoxy-aniline-(3)-sulphonic acid, 4-methoxy-aniline-(2)-sulphonic acid, 4-ethoxy-aniline-(3)-sulphonic acid, 4-ethoxyaniline-(2)-sulphonic acid, 4-propoxy-aniline-(3)-sulphonic acid, 4-isopropoxy-aniline-(2)-sulphonic acid, 4-butoxyaniline-(3)-sulphonic acid, 4-isobutoxy-aniline-(2)-sulphonic acid and 4-tert.-butoxyaniline-(3)-sulphonic acid.

Possible coupling components of general formula:

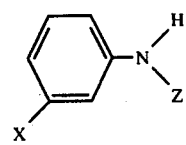

are for example: m-toluidine, aniline-ω-methanesulphonic acid or anilinesulphamic acid. In addition to phenol, the following substituted phenols are for example suitable coupling components for the second coupling: 2-methyl-1-hydroxybenzene, 3-methyl-1-hydroxybenzene, 2,5-dimethyl-1-hydroxybenzene, 3,5-dimethyl-1-hydroxybenzene, 2,6-diethyl-1-hydroxybenzene, 2-isopropyl-1-hydroxybenzene, 2-chloro-1-hydroxybenzene, 3-chloro-1-hydroxybenzene, 3-chloro-2-methyl-1-hydroxybenzene, 2-methyl-5-chloro-1-hydroxybenzene, and 2-chloro-5-methyl-1-hydroxybenzene.

The alkylation of the p-hydroxy-disazo dyestuff can for example be carried out by means of dimethyl sulphate, diethyl sulphate, ethyl bromide, methyl chloride, propyl bromide, isopropyl chloride, butyl iodide or isobutylene.

In some cases the dyestuffs according to the invention can also be synthesised in the reverse sequence, if diazotised 4-alkoxyanilines of general formula

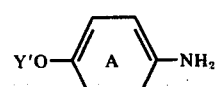
(VI)

wherein
Y' represents an alkyl group with 1–4 carbon atoms and the ring A can be substituted by chlorine or alkyl groups with 1–4 C atoms,
are combined with aniline derivatives capable of coupling, of general formula

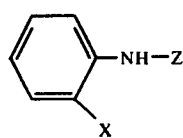

(VII)

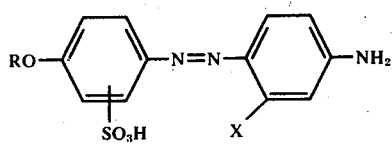

(XII)

wherein

X and Z have the abovementioned significance, the resulting monoazo dyestuffs of formula

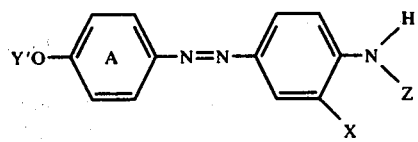

(VIII)

are further diazotised, where appropriate after liberating the amino group, and coupled in an alkaline medium to phenol-2-or -3-sulphonic acid, and the hydroxyl group in the disazo dyestuffs thus obtained, of formula

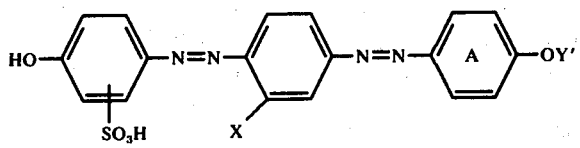

(IX)

is etherified with an alkylating agent which introduces an alkyl radical with 1–4 carbon atoms.

Finally, the dyestuffs according to the invention can also be synthesised if a diazotised middle component

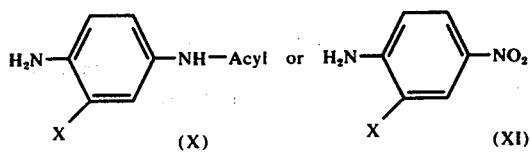

wherein

X has the abovementioned significance and

Acyl represents an acyl radical, for example an acetyl, oxalyl or benzoyl radical, is coupled in an alkaline medium with phenol-2 or 3-sulphonic acids, the hydroxyl group is subsequently alkylated and, when using the acyl compound (X), the acyl radical is split off or, when using the nitro compound (XI), the nitro group is reduced to the amino group, and the resulting alkoxy-amino compound of formula is diazotised, coupled with phenols of formula (V) and optionally subsequently alkylated.

The dyestuffs according to the invention are suitable for dyeing synthetic fibre materials, especially for dyeing polyamide fibres in level, strong, reddish-tinged to brownish-tinged yellow and orange shades of very good light fastness. They are absorbed on polyamide fibres even in neutral to weakly acid dyebaths. By polyamide fibres there are here especially understood those of synthetic polyamides such as $\epsilon$-polycaprolactam or condensation products from adipic acid and hexamethylenediamine.

EXAMPLE 1

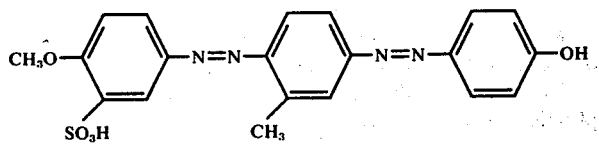

20.3 g (=0.1 mol) of 4-aminoanisole-(2)-sulphonic acid are dissolved at pH 7 in 200 ml of water with sodium hydroxide solution, 6.9 g of sodium nitrite are added, the mixture is cooled with ice, and 28 ml of concentrated hydrochloric acid are added at 0°–5°. The diazotisation is complete after 30 minutes. A solution of 10.7 g (=0.1 mol) of 3-aminotoluene in 100 ml of water and 5 ml of concentrated hydrochloric acid is then added to the diazo suspension. The mixture is then slowly neutralized with concentrated sodium hydroxide solution, at 0°–10°, until the pH value is 6. The dyestuff is salted out with 10% of sodium chloride and filtered off.

The aminoazo dyestuff thus obtained is dissolved in 300 ml of water at pH 7. 6.9 g of sodium nitrite are then added, the mixture cooled, and 28 ml of concentrated hydrochloric acid added all at once at 0°–5°. After 1 hour's diazotisation, the diazo suspension is introduced into a solution of 9.4 g (=0.1 mol) of phenol in 200 ml of water + 6.0 ml of 40% strength sodium hydroxide solution + 25 g of sodium carbonate. Coupling takes place immediately. The precipitated dyestuff is filtered off and dried at 50°. Yield = 36 g.

If the above procedure is followed but the compound quoted in column I is used as the diazo component, the compound quoted in column II is used as the middle component and the compound quoted in column III is used as the end component, valuable water-soluble diazo dyestuffs are again obtained, which dye polyamide in the reddish-tinged yellow to brown-yellow shades of excellent light fastness.

| No. | I | II | III | Colour shade on polyamide |
|---|---|---|---|---|
| 2 | 3-amino-4-methoxy-benzenesulfonic acid (CH₃O, NH₂, SO₃H on benzene) | 3-methylaniline (NH₂, CH₃) | 2-methylphenol (OH, CH₃) | reddish-tinged yellow |
| 3 | " | phenyl-NH-CH₂SO₃H | phenol (OH) | " |
| 4 | " | 3-methylaniline (NH₂, CH₃) | 2-chlorophenol (Cl, OH) | " |
| 5 | 3-amino-4-methoxy-benzenesulfonic acid | 3-methylaniline | 2-isopropylphenol (C₃H₇(iso), OH) | reddish-tinged yellow |
| 6 | " | " | 2-chloro-5-methylphenol (Cl, OH, CH₃) | " |
| 7 | 3-amino-4-ethoxy-benzenesulfonic acid (C₂H₅O, NH₂, SO₃H) | " | phenol (OH) | " |
| 8 | " | phenyl-NH-CH₂SO₃H | 2,4-dimethylphenol (CH₃, OH, CH₃) | " |
| 9 | CH₃O-, NH₂, SO₃H on benzene | 3-methylaniline (NH₂, CH₃) | 2,6-diethylphenol (C₂H₅, OH, C₂H₅) | " |
| 10 | 2-methoxy-aniline-sulfonic acid (CH₃O, NH, SO₃H) | " | phenol (OH) | brown-yellow |
| 11 | C₃H₅-O-, NH₂, SO₃H on benzene | " | " | " |
| 12 | C₄H₉(n)-O-, NH₂, SO₃H on benzene | " | " | reddish-tinged yellow |
| 13 | CH₃O-, NH₂, SO₃H on benzene | " | 2-chloro-5-methylphenol (Cl, OH, CH₃) | brown-yellow |
| 14 | " | phenyl-NH-CH₂SO₃H | phenol (OH) | brown-yellow |

-continued

| No. | I | II | III | Colour shade on polyamide |
|---|---|---|---|---|
| 15 | C₂H₅O—⟨⟩—NH₂ with SO₃H | ⟨⟩—NH—CH₂SO₃H | ⟨⟩—OH | reddish-tinged yellow |
| 16 | " | ⟨⟩—NH₂ with CH₃ | ⟨⟩—OH with CH₃ | " |

EXAMPLE 17

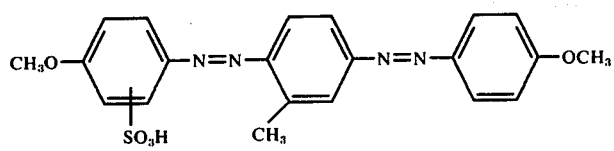

The dyestuff manufactured according to example 1 can be alkylated as follows:

36 g of dyestuff are dissolved at pH 9 in 400 ml of water at 35° with sodium hydroxide solution, and 12.6 g of dimethyl sulphate are added dropwise at 35° over the course of 30 minutes. In the course thereof, the pH value is kept at 9 by means of 10% strength sodium hydroxide solution. After the dropwise addition is complete and the pH does not change, the precipitated methylation product is filtered off and dried at 50°. Yield: 28 g.

If the procedure corresponding to the data in the above example is followed, but instead of the dyestuff of example 1 the dyestuffs of examples 2, 3, 4, 7, 10, 11, 14 or 15 are etherified at the phenolic hydroxyl group by means of dimethyl sulphate, dyestuffs are obtained which again dye polyamide fibres in red-brown-tinged yellow shades of excellent light fastness.

Instead of using dimethyl sulphate, the dyestuff of example 1 can also be etherified at the phenolic hydroxyl group by means of diethyl sulphate, isopropyl chloride or n-butyl bromide, and valuable reddish-tinged yellow dyestuffs for polyamide fibres are then again obtained.

EXAMPLE 18

A dyebath consisting of 100 parts by weight of polyamide carpet material and 4000 parts of water is adjusted to pH 6 by adding 2 parts of acetic acid.

1 part of the dyestuff obtained according to example 17, dissolved in a little hot water, is added thereto at 40° C, the mixture is heated to the boil in 30 minutes and dyeing is carried out at the boil for one hour at pH 6-7, in the course of which the bath is largely exhausted. After rinsing and drying, the polyamide carpet is dyed in a strong, clear, reddish-tinged yellow shade of excellent light fastness.

EXAMPLE 19

0.1 mol of 4-acetylaminoaniline is diazotised in the usual manner and combined, in an alkaline medium, with a solution of 0.1 mol of phenol-3-sulphonic acid. After completion of coupling, the resulting monoazo dyestuff is isolated and methylated with dimethyl sulphate according to the process of example 17. The methoxy dyestuff is saponified for about 1 hour with 4% strength aqueous sodium hydroxide solution. The resulting aminoazo compound is diazotised at room temperature and coupled with an alkaline solution of 0.1 mol of phenol. The product is isolated in the usual manner by salting out, and after drying and powdering a dark powder is obtained which dissolves in water to give a golden yellow colour and dyes polyamide fibres in yellowish-tinged orange shades. If 3-methylphenol is used as the end component, a dyestuff is obtained which dyes polyamide yellowish-tinged orange.

We claim:

1. Disazo dyestuff which in the form of the free acid has the formula

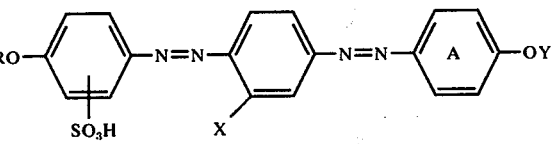

in which
R is alkyl having 1–4 carbon atoms;
X is hydrogen or methyl;
Y is alkyl having 1–4 carbon atoms; and
the ring A is unsubstituted or once or twice substituted by chlorine or alkyl having 1–4 carbon atoms.

2. The dyestuff of claim 1 in which A is unsubstituted or is once or twice substituted with chloro, methyl or ethyl.

3. The dyestuff of claim 1 in which A is unsubstituted or is substituted with 1 member selected from the group consisting of chloro, and alkyl having 1–4 carbon atoms.

4. The dyestuff of claim 1 having the formula

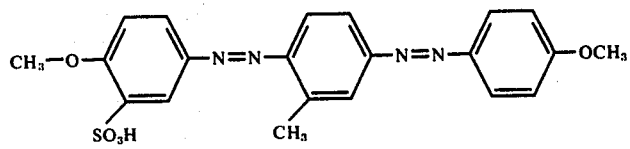
5. The dyestuff of claim 1 having the formula
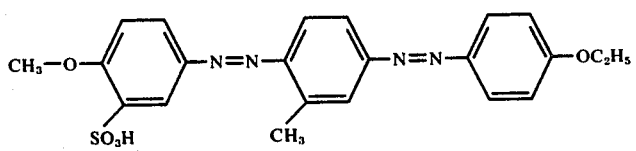
* * * * *